US005781290A

United States Patent [19]
Bittner et al.

[11] Patent Number: 5,781,290
[45] Date of Patent: Jul. 14, 1998

[54] SPECTRAL APPARATUS OF THE CONCENTRIC TYPE HAVING A FERY PRISM

[75] Inventors: Reinhold Bittner, Schwäbisch Gmünd, Germany; Yves Delclaud, Callian, France; Guy Cerutti-Maori, Cannes La Bocca, France; Jean-Yves Labandibar, Theoule Sur Mer, France

[73] Assignees: Aérospatiale Société National Industrielle, Paris, France; Carl-Zeiss-Stiftung, Heidenheim, Germany

[21] Appl. No.: 730,710

[22] Filed: Oct. 15, 1996

[30] Foreign Application Priority Data

Oct. 12, 1995 [DE] Germany .......... 195 37 949.7

[51] Int. Cl.⁶ ......................................... G01J 3/28
[52] U.S. Cl. ......................................... 356/326
[58] Field of Search ........................ 356/326, 328, 356/330–334, 307, 302, 305

[56] References Cited

U.S. PATENT DOCUMENTS 1,007,346  10/1911  Fery .
2,594,334   4/1952  Miller .
2,874,608   2/1959  Beloian ............................. 356/332
5,127,728   7/1992  Warren et al. ..................... 356/302

FOREIGN PATENT DOCUMENTS 441595  3/1927  Germany .

OTHER PUBLICATIONS

"Theory of concentric designs for grating spectrometers" by D. R. Lobb, Applied Optics, vol. 33, No. 13, May 1994, pp. 2648 to 2658.

"Die Anwendung von aplanatischen Prismen in Monochromatoren und Spektrographen" by R. N. Wilson, Optik, vol. 29, 1969, pp. 17 to 29.

Primary Examiner—K. Hantis
Attorney, Agent, or Firm—Walter Ottesen

[57] ABSTRACT

The conventional grating is substituted by one or more curved prisms in a concentric spectrometer of the type derived from the Offner mirror objective. The curved prisms are known as Féry prisms. The deviations from the concentric form are used as a corrective device. The spectral apparatus is especially suited as an imaging spectrometer having a detector array because the two-dimensional image can be formed in the direction of the spatial coordinate as well as the spectral coordinate without distortions and curvatures.

27 Claims, 6 Drawing Sheets

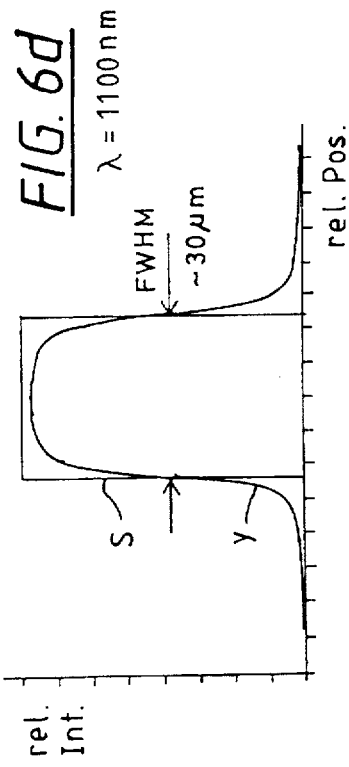
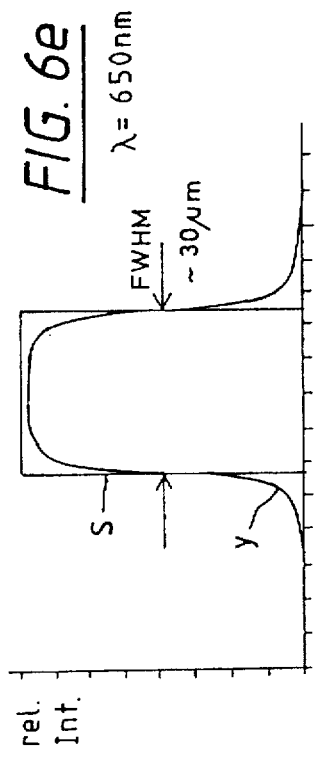
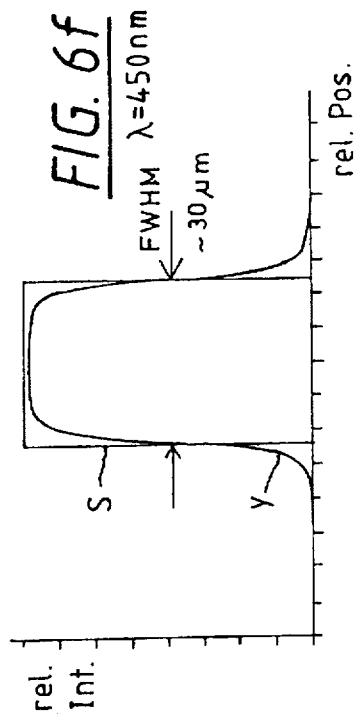
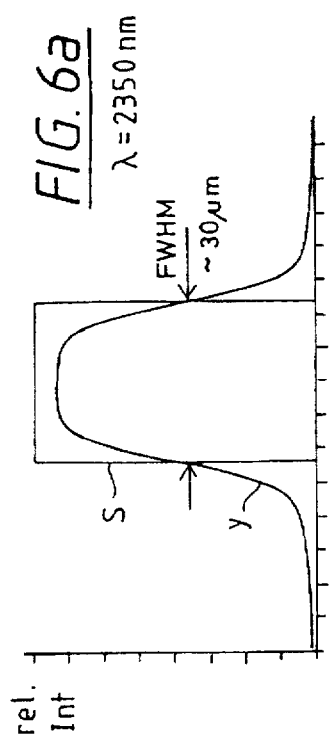
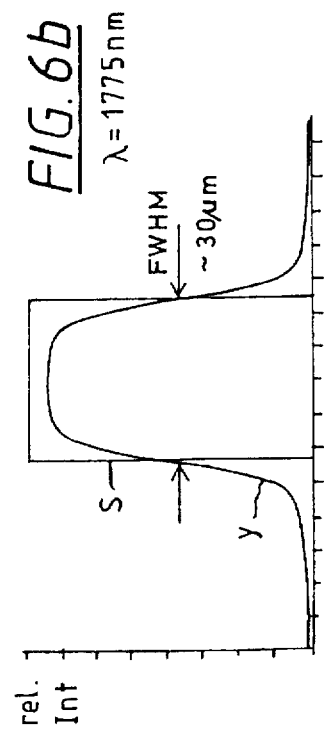
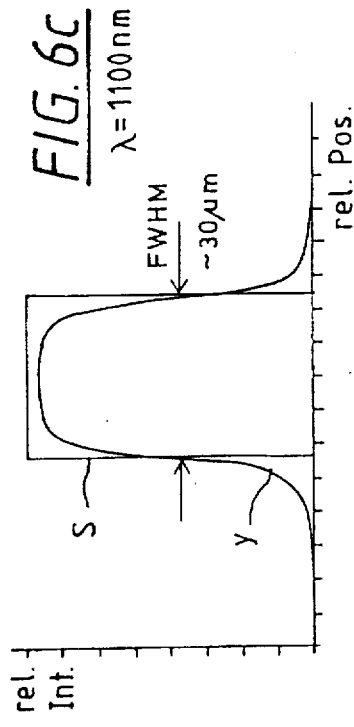

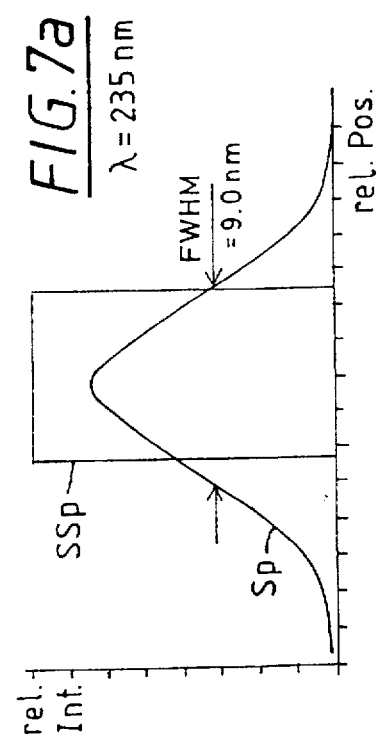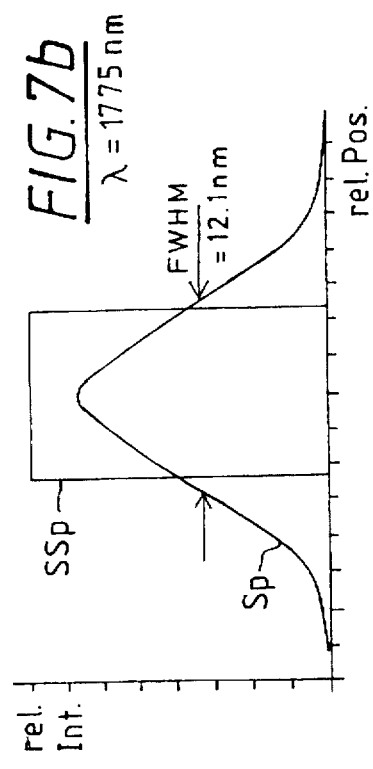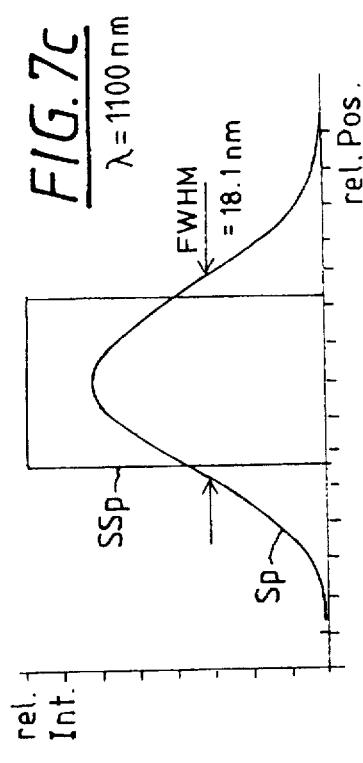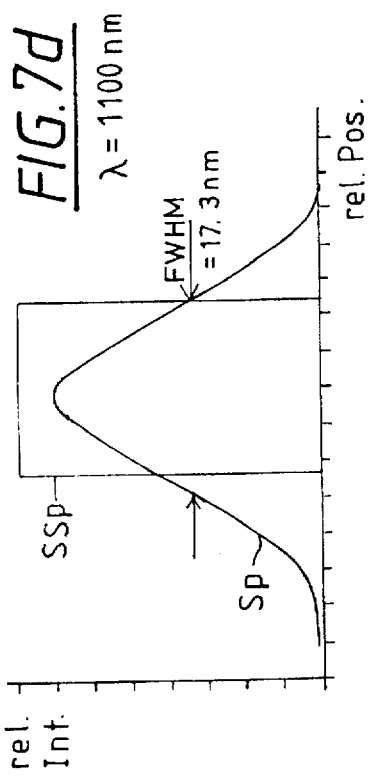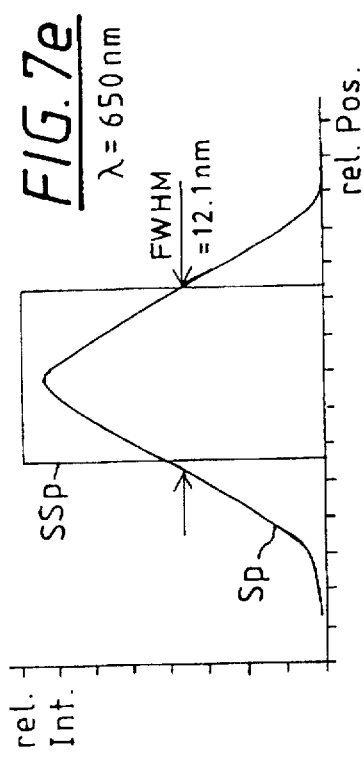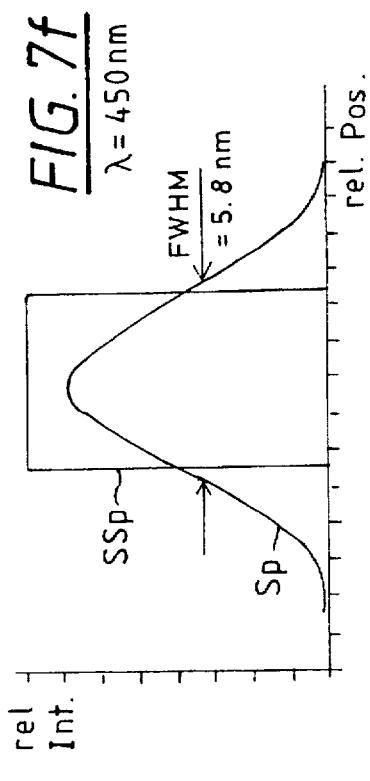

SPECTRAL APPARATUS OF THE CONCENTRIC TYPE HAVING A FERY PRISM

FIELD OF THE INVENTION

The invention relates to a spectral apparatus having the following optical elements arranged sequentially in the beam path: an entry slit, a first concave mirror, a convex mirror, a second concave mirror and an image surface. A dispersive element is arranged between the first and second concave mirrors.

BACKGROUND OF THE INVENTION

An imaging spectrometer of the kind defined above is disclosed in the paper of D. R. Lobb entitled "Theory of concentric designs for grating spectrometers", Applied Optics, volume 33 (1994), pages 2648 to 2658. In this spectrometer, the dispersive element is a grating applied to the convex mirror. The derivation from a concentric Offner imaging objective is described. For a large spectral range, difficulties occur with grating spectrometers because of the superposition of various diffraction orders. Curved prisms as a dispersive element of spectral apparatus such as spectrometers and monochromators are known, for example, from German Patent 441,595. These prisms are characterized as Féry prisms and usually have spherical surfaces of which one is mirrored.

The paper by R. N. Wilson entitled "Die Anwendung von aplanatischen Prismen in Monochromatoren und Spektrographen", Optik, volume 29 (1969), pages 17 to 29, discloses the Féry prism also in combination with a spherical concave mirror (referred to as "air prism"). The combination of several prisms mounted one behind the other and prism-grating combinations are mentioned.

SUMMARY OF THE INVENTION

The spectral apparatus according to the invention is suitable as an imaging spectrometer having a large spectral bandwidth. A simple and robust assembly is wanted.

The above task is solved by a spectral apparatus wherein the dispersive element comprises one or several curved prisms.

The spectral apparatus of the invention defines an optical beam path along which a beam can travel. The spectral apparatus includes: an entry slit arranged on the optical beam path; a first concave mirror mounted on the beam path downstream of the entry slit for deflecting the beam; a prismatic unit arranged on the beam path and including at least one curved prism for dispersing the beam; a second concave mirror arranged on the beam path for receiving and deflecting the dispersed beam; and, an image surface receiving the deflected and dispersed beam to provide a spectral image thereof.

The invention is based on the realization that a Féry prism exhibits a Rowland circle in the same manner as a concave grating. This makes it possible to substitute the Féry prism in a concentric spectrometer of the Offner type.

According to a feature of the invention, the beam path passes twice through the prisms which are mounted forward and rearward of the convex mirror. The dispersive effect is correspondingly large. The convex mirror can, preferably, be configured on a prism surface of the dispersive element. However, an air gap is here also possible but then the number of the parts to be adjusted increases. As a rule, the first and second concave mirrors lie on a common sphere and can be united to one piece. This is also provided in the concentric grating spectrometer according to the teaching of D. R. Lobb referred to above and for an Offner objective. An independent configuration of both concave mirrors for corrective purposes can also be provided. The concave mirrors have different radii and/or centers of curvature as well as an aspheric form.

According to another feature, spherically curved prisms such as Féry prisms are provided. These are essentially off-center sections of spherical lenses and can be easily produced. However, aspherical surfaces such as toroidal surfaces can also be provided for special corrections.

By combining several curved prisms, the dispersion of the spectrum, which is generated in the image surface, can be linearized. According to another feature of the invention, two or three spherically curved prisms can be provided without an air gap disposed therebetween. Thus, two or three prisms can be joined together without gaps therebetween.

The primary use of the invention is for the imaging spectrometer. Accordingly, a two-dimensional image detector is mounted in the image surface and, in this way, an imaging spectrometer is realized. The image surface must be correspondingly planar.

As image detectors, all detectors are suitable which combine the desired spatial and time-dependent resolution with the required spectral bandwidth and sensitivity. One example are CCD arrays. Furthermore, these components are known and widely used in spectrometry, video technology and the like.

According to still another feature of the invention, the spacing of the convex mirror from the first concave mirror is 0.4 to 0.6 times (preferably 0.5 times) the radius of the first concave mirror. The radius of the convex mirror is 0.4 to 0.6 times (preferably 0.5 times) the radius of the first concave mirror. Corresponding conditions are provided with respect to the convex mirror and the second concave mirror. Preferably, the focal point of the first concave mirror lies in the dispersive element. Accordingly, this includes the case wherein the focal point lies on the convex mirror configured as a prism surface.

The centers of the radii of curvature of all mirrors lie close to each other. According to another feature of the invention, the spectral apparatus is a concentric spectrometer having the well known excellent suitability as an imaging spectrometer. The given tolerances provide the possibility to provide corrections while considering the prism effects. Further improvements are provided by corrective lenses which can be mounted between the entry slit and the first concave mirror or between the concave mirror and the image surface.

If the spectral bandwidth of the spectrometer is greater than the bandwidth of available detectors, then a dichroic mirror can be mounted forward of the image surface. This mirror can deflect a spectral region onto a second image surface where a detector with appropriate sensitivity is mounted.

The configuration up to the dispersive element corresponds to an Offner objective. According to another feature of the invention, the spectral apparatus can include a diffraction grating. This diffraction grating can be configured on one of the mirrors as a corrective device or can be mounted downstream of the entire arrangement which then serves as a predisperser.

BRIEF DESCRIPTION OF THE DRAWINGS

The invention will now be described with reference to the drawings wherein:

FIGS. 6a to 6f show the spatial distribution in the direction of the elevation of the slit of the image of a pixel in comparison to the exact image for different wavelengths on both image surfaces;

FIGS. 7a to 7f show the spectral distribution per pixel in comparison to the exact image for different wavelengths on both image surfaces; and, FIGS. 8a and 8b show the linear dispersion plotted against the wavelength λ for the SWIR-range and for the VNIR-range.

DESCRIPTION OF THE PREFERRED EMBODIMENTS OF THE INVENTION

Figure 1:
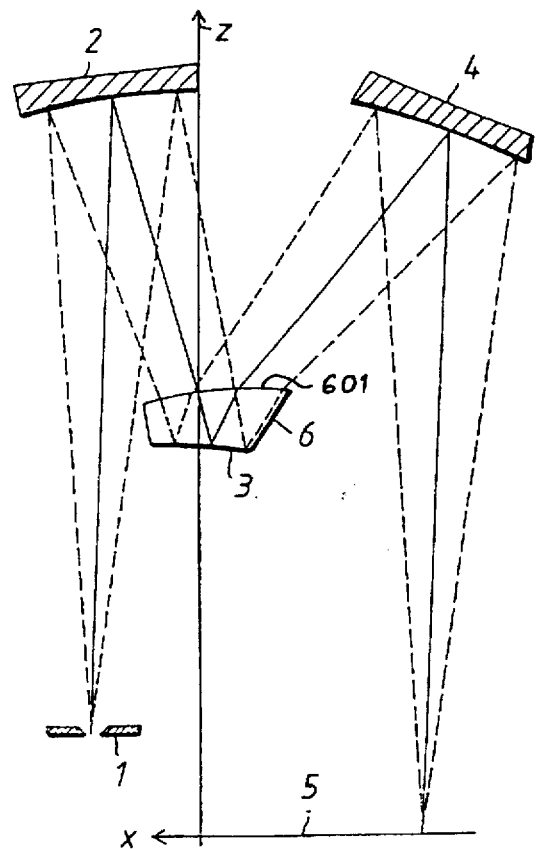
FIG. 1 is a schematic section view of an embodiment for the basic form of the Féry-Offner spectrometer having a Féry prism.

An example of the basic form of the Féry-Offner spectrometer is shown in FIG. 1. Reference character Z identifies the reference axis. An entry slit of up to 12 mm (±6 mm) elevation lies 20.00 mm laterally of reference axis Z. The first concave mirror 2 lies on the reference axis Z at a distance of 150.00 mm and has a radius of −161.77 mm and is tilted by −1.81°, that is, the center of curvature lies to the right of the reference axis Z (4.6 mm).

The first surface 601 of the Féry prism 6 lies on the reference axis Z at −70.00 mm and has the radius −92.763 mm and is tilted by −10.00°. Accordingly, the prism angle is 10°. The Féry prism 6 is made of glass BK7 produced by Schott Glaswerke of Mainz, Germany. The rear surface of the Féry prism 6 is joined to the convex mirror 3. The spacing on the reference axis Z is −11.906 mm and the radius is −79.757 mm and the tilt angle vanishes. The center point of curvature lies on the reference axis Z.

The diaphragm of the system lies on this convex mirror 3. The numerical aperture at the object end is 0.10. The spacing of the center points of curvature of the first concave mirror 2 and of the convex mirror 3 is approximately 5 mm or approximately 3% of the radius of the first concave mirror 2.

The second concave mirror 4 lies on the same sphere as the first concave mirror 2. Accordingly, the second concave mirror 4 has the same determining parameters and can be joined to the concave mirror 2 to form one piece. Only the illuminated regions are distinguished. The image surface 5 lies on the reference axis Z displaced by −170.88 mm, displaced rearwardly relative to the object plane (the entry slit 1) by 20.88 mm and tilted toward the right by 1.00°.

On the image surface 5, a spectral image is generated having a spatial axis corresponding to the slit elevation coordinate and a spectral axis perpendicular thereto. This spectral image is sufficiently planar for commercial array detectors and is geometrically distortion free. However, with a single prism, the wavelength scale is perforce nonlinear because of the corresponding trace of the linear dispersion of the glass.

Figure 2:
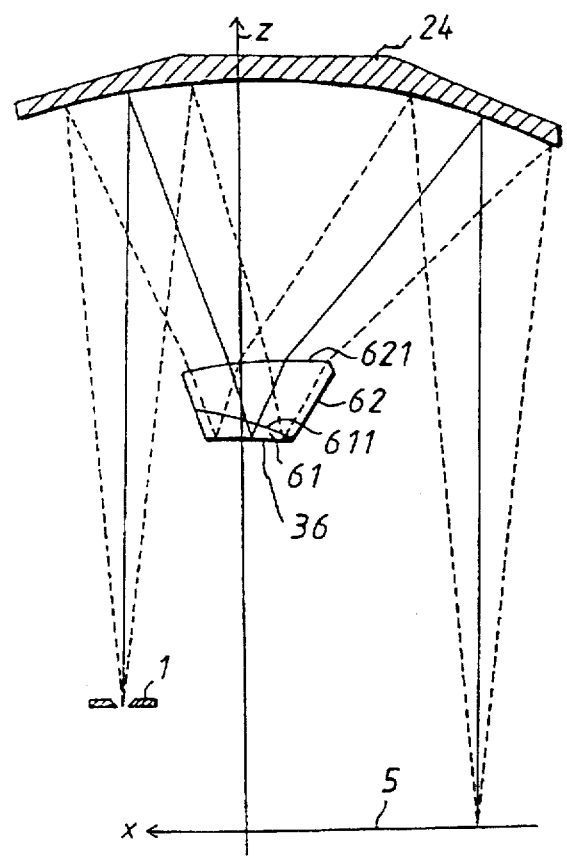
FIG. 2 is a schematic showing an embodiment with two Féry prisms for linearizing the dispersion.

This problem, however, can be solved by the combination of several Féry prisms of different materials. FIG. 2 is an embodiment showing two prisms 61 and 62. The convex mirror is configured as coating 36 of the first prism 61. The two concave mirrors are explicitly combined to a unit 24. The following Table 1 shows the data of this example.

TABLE 1 corresponding to FIG. 2

| Surface | Radius (mm) | Tilt Angle (°) | Spacing (mm) | Glass |
|---|---|---|---|---|
| 1 | ∞ | 0.00 | 450.00 | |
| 24 | −488.18 | −1.06 | −202.17 | |
| 621 | −297.14 | −7.00 | −39.60 | Schott LAK9 |
| 611 | −228.51 | 16.00 | −14.36 | Schott F2 |
| 36 | −233.17 | 0.00 | | |
| Spacing 24-5 | | | −540.00 | |
| 5 | ∞ | 0.00 | | | wherein: the slit elevation is 20 mm, the numerical aperture at the object end is 0.10, and the diaphragm lies at the convex mirror 36. The slit position is located laterally 78 mm and the linear dispersion is as follows:

537 nm/mm at 450 nm, 432 nm/mm at 650 nm, and 515 nm/mm at 1100 nm.

The linear dispersion is, in this example, therefore essentially stabilized.

Figure 3:
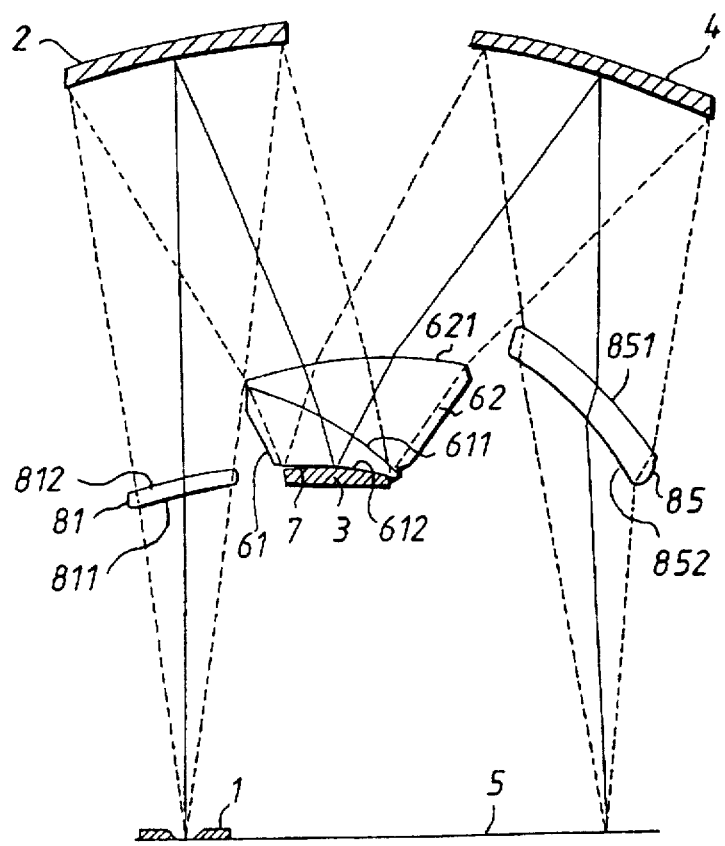
FIG. 3 is an embodiment having an air gap between the prisms and the concave mirror and having corrective lenses.

The embodiment of FIG. 3 likewise includes two prism 61 and 62 but with an air gap 7 toward the convex mirror 3. In addition, two corrective lenses (81, 85) are provided. The data are given in Table 2 below.

TABLE 2 corresponding to FIG. 3

| Surface | Radius (mm) | Tilt Angle (°) | Spacing (mm) | Glass |
|---|---|---|---|---|
| 1 | ∞ | 0.00 | 202.03 | |
| 811 | −279.35 | 0.00 | 7.46 | Schott Ultran 30 |
| 812 | −332.42 | 0.00 | 240.51 | |
| 2 | −452.60 | −2.38 | −182.76 | |
| 621 | −222.88 | −10.46 | −26.00 | Quartz |
| 611 | −182.06 | 26.09 | −33.00 | Schott Ultran 30 |
| 612 | −170.55 | 0.00 | −1.50 | |
| 3 | −206.99 | 0.00 | | |
| 4 | identical to surface 2 | | −130.00 | |
| 851 | −226.21 | 0.00 | −17.40 | Schott Ultran 30 |
| 852 | −205.78 | 0.00 | −303.47 | |
| 5 | ∞ | 0.00 | | |

For the example shown in FIG. 3, the slit elevation is 30 mm and the numerical aperture at the object end is 0.13. The diaphragm is on the convex mirror 3 and the slit position is laterally 69 mm.

Figure 4:
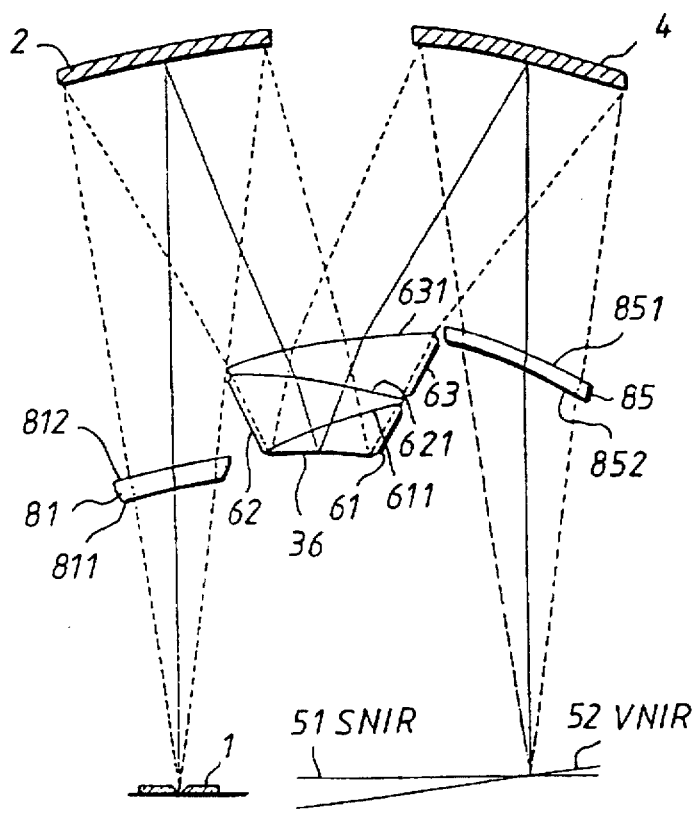
FIG. 4 is a schematic of an embodiment having three prisms and two corrective lenses.

The following embodiment of FIG. 4 is directed to a spectrometer which is, at the same time, suitable for the spectral range VNIR (visible-near infrared) of 450 to 1100 nm and SWIR (shortwave infrared) of 1100 to 2350 nm. The image surface (51, 52) is different for both spectral ranges. Various detectors are also needed because none are obtainable with the total bandwidth. The detectors can, as required, be used alternatively, for example, with the aid of a pivot device. A dichroic beam-splitter mirror can be provided after the corrective lens 85. This beam-splitter mirror separates the two image surfaces (51, 52) so that both can be simultaneously provided with a detector.

Three Féry prisms (61, 62, 63) are provided for adequate linearization of the linear dispersion over the expanded spectral range. Table 3 shows the construction data of this example.

TABLE 3 corresponding to FIG. 4

| Surface | Radius (mm) | Tilt Angle (°) | Spacing (mm) | Glass |
|---|---|---|---|---|
| 1 | ∞ | 0.00 | 190.74 | |
| 811 | −363.96 | 0.00 | 13.09 | Schott Ultran 30 |
| 812 | −388.22 | 0.00 | 246.17 | |
| 2 | −459.99 | −0.86 | −183.14 | |
| 631 | −284.97 | −11.21 | −20.00 | Quartz |
| 621 | −276.63 | 8.74 | −33.00 | Schott Ultran 30 |
| 611 | −260.74 | 22.26 | −12.00 | Quartz |
| 36 | −222.35 | 0.00 | | |
| 4 | identical to surface 2 | | −162.00 | |
| 851 | −289.15 | 0.00 | −9.00 | Schott Ultran 30 |
| 852 | −279.03 | 0.00 | | |
| 51 | ∞ | −1.06 | −279.22 | SWIR |
| 52 | ∞ | −6.34 | −291.01 from 852 | VNIR |

The slit elevation is 30 mm and the numerical aperture at the object end is 0.13. A diaphragm is on the convex mirror 36 and the position of the slit is 75.00 mm to the side.

Figure 5:
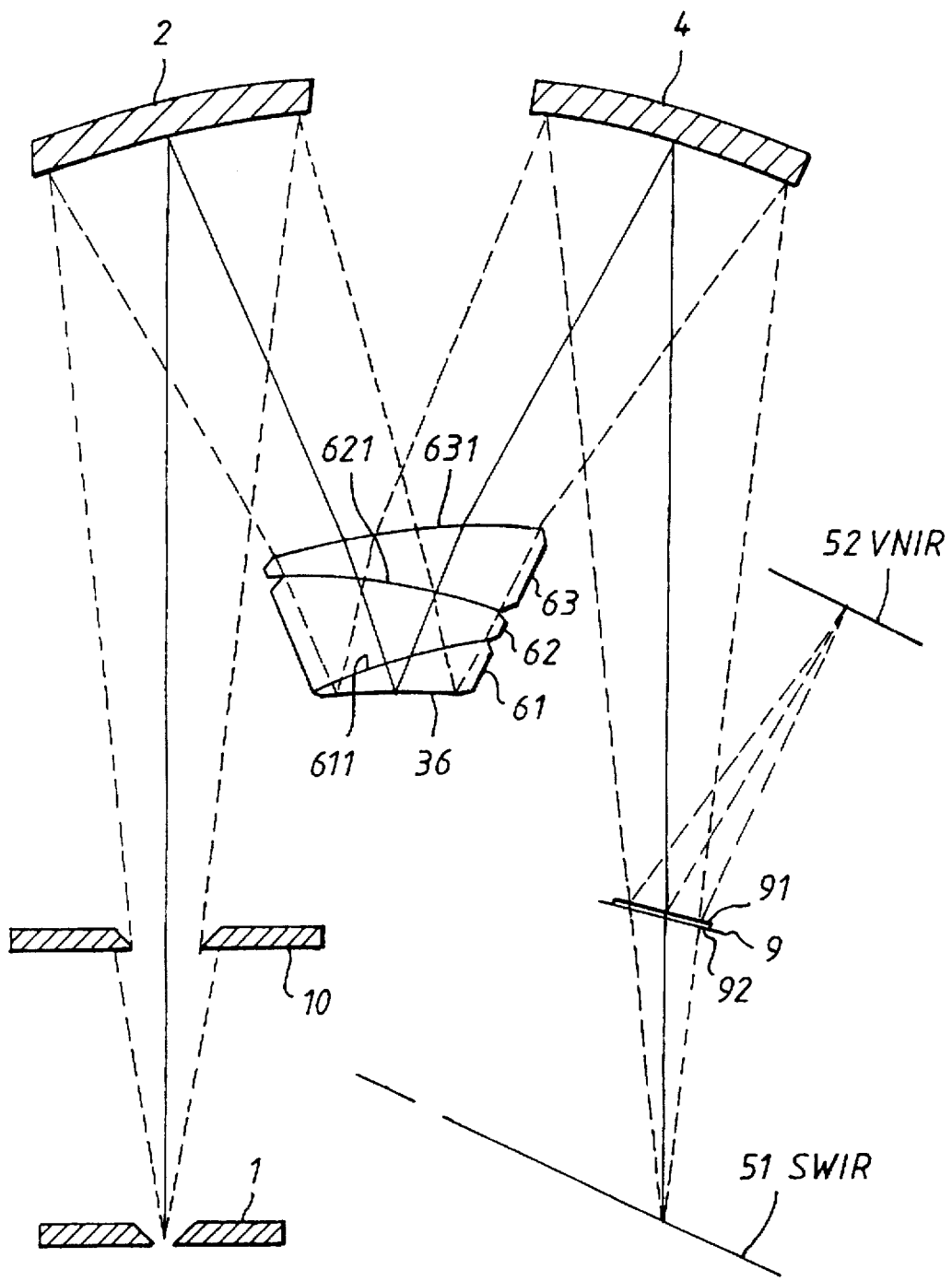
FIG. 5 is an embodiment having three prisms with a diaphragm at the entry end and a dichroic beam splitting mirror at the exit end and two image surfaces.

FIG. 5 shows an embodiment having the same spectral bandwidth as FIG. 4 and equipped likewise with three prisms (61, 62, 63). A dichroic mirror 9 is explicitly provided and, correspondingly, this mirror has two image surfaces, namely, surface 51 for SWIR and image surface 52 for VNIR. Corrective lenses are not needed because their function is substituted by the greatly inclined position of the image surfaces (51, 52). The aperture diaphragm 10 here lies between the entry slit 1 and the first concave mirror 2.

The following Table 4 provides construction data.

TABLE 4 corresponding to FIG. 5

| Surface | Radius (mm) | Tilt Angle (°) | Spacing (mm) | Glass |
|---|---|---|---|---|
| 1 | ∞ | 0.000 | 138.000 | |
| 10 | Diaphragm | 0.000 | 402.000 | |
| 2 | −527.908 | −0.432 | −201.667 | |
| 631 | −342.357 | −6.977 | −24.000 | Quartz |
| 621 | −274.006 | 9.034 | −39.600 | Schott PK51A |
| 611 | −301.253 | −17.414 | −14.400 | Quartz |
| 36 | −241.883 | 0.000 | | |
| 4 | identical to surface 2 | | −351.098 | |
| 91 | ∞ | 15.000 | −3.000 (dichroically coated) | Quartz |
| 92 | ∞ | 15.000 | | |
| 51 | ∞ | 25.065 | −116.923 from 92 | for SWIR |
| 52 | ∞ | 25.297* | −115.159 from 91 | for FNIR |

*Reflection at surface 91 not considered

The slit elevation is 30 mm and the numerical aperture at the object end is 0.13. The slit is located laterally 110.00 mm.

Quartz and glass PK51A have suitable dispersion characteristics with high transparency in the entire spectral range. The transmission drops only for PK51A above 2 μm to approximately 90%. Protected silver layers function as mirrors. Magnesium fluoride individual layers are provided for reducing reflection.

As a dichroic divider mirror 9, a coating on quartz from the Balzers Company of Liechtenstein is provided which is highly reflective up to 1000 nm (460 nm to 900 nm less than 4% transmittant) and is transmittant above 1000 nm (1100 nm to 2400 nm more than 90% transmittant) and this at an angle of incidence up to 30% and for all polarization directions. The range around 1100 nm is distributed to both image surfaces (51, 52).

The good quality obtained is shown by FIGS. 6a to 6f and FIGS. 7a to 7f. FIGS. 6a to 6f show the spatial point distribution function y on a pixel of the detectors with a 30 μm geometric expansion in each case in the direction of the spatial and the spectral coordinates. FIGS. 6a to 6c apply then to the SWIR detector in the image surface 51. FIGS. 6d and 6e apply to the VNIR detector in the image surface 52. Reference character S identifies, in each case, the theoretical shadow image. The curve y is, in each case, averaged over several field elevations, that is, positions in the slit 1. The half width of the curve y is, in each case, FWHM=30 μm, that is, the pixel scale.

In FIGS. 7a to 7f, the spectral point distribution function Sp for 30 μm width of the entry slit 1 is given. The theoretical shadow image of the geometric 30 μm wide pixel is given as SSp. The spectral width of the pixel is dependent upon wavelength. The half width FWHM of the curve Sp is, in each case, given in a wavelength dimension and is, without exception, approximately equal to the pixel width multiplied by a factor of 1.2. The distinct triangular shape of the curve Sp results from the convolution of the slit width with the width of the pixels. FIGS. 7a to 7c again apply to the SWIR detector in the image surface 51. FIGS. 7d to 7f are for the VNIR detector in the image surface 52.

Figure 8A:
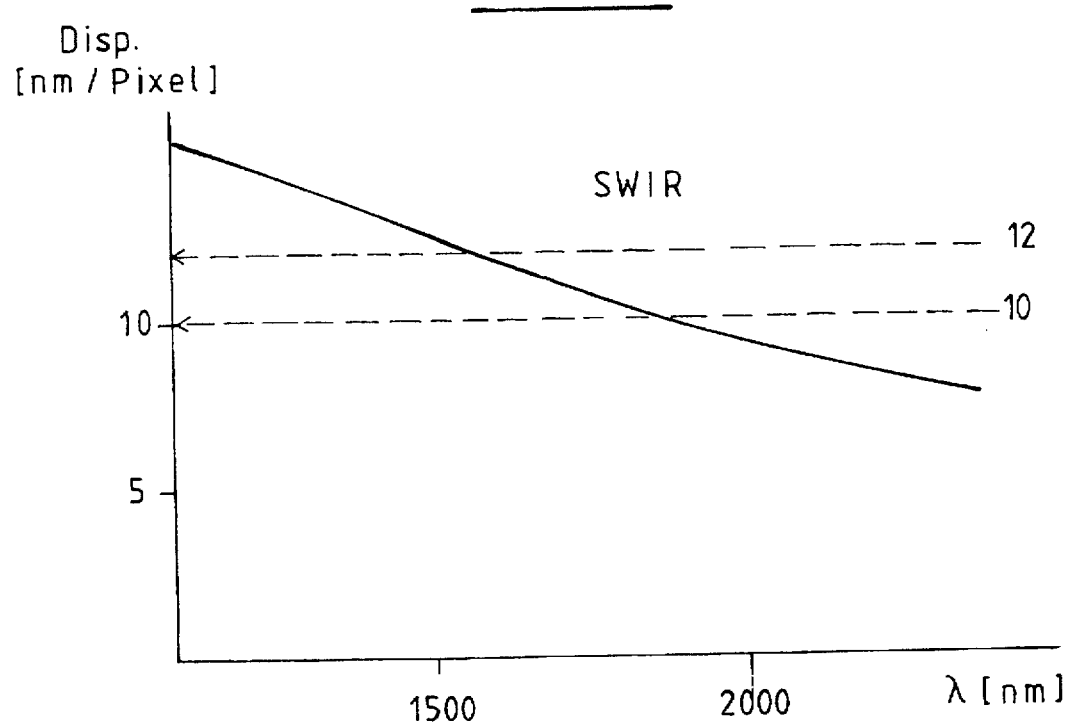
Figure 8B:
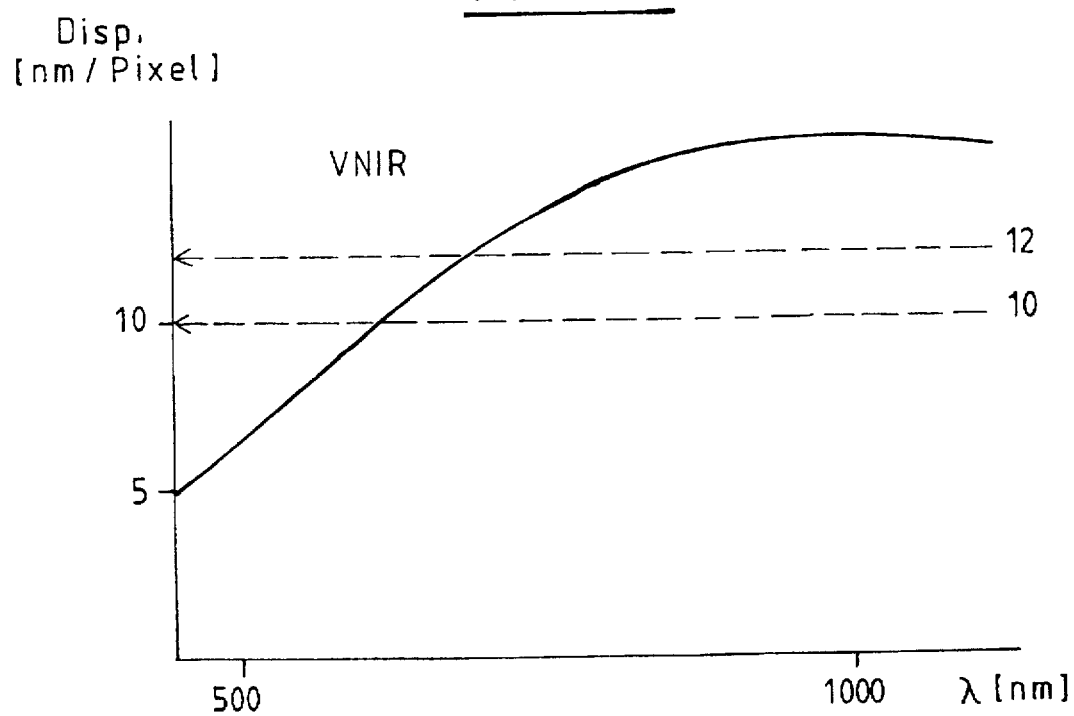

The dispersion of the spectrometer is shown in FIG. 8a for the SWIR range and, in FIG. 8b, for the VNIR range. In the SWIR range, the dispersion drops approximately linearly from 15 nm/pixel at 1000 nm wavelength to approximately 7.5 nm/pixel at 2350 nm. In the VNIR range, the dispersion increases from approximately 5 nm/pixel at 450 nm to approximately 15 nm/pixel at 900 nm to 1100 nm.

The mean dispersion can be adapted to the requirements by a scaled enlargement of the entire spectrometer.

The most important quality of an imaging spectrometer is the absence of distortion in the spatial and spectral coordinates in the image plane. Table 5 provides the spatial register errors for the spectrometer of FIG. 5 and Table 6 the spectral register errors. The register errors are insignificant referred to the pixel magnitude of 30 μm.

TABLE 5

Change of Elevation of the Centroid of the Spot Diagram for different Field Points

| Field/ Slit Elevation (mm) | 2350 nm | SWIR 775 nm | 110 nm | 1100 nm | VNIR 650 nm | 450 nm | Spatial Registration Error |
|---|---|---|---|---|---|---|---|
| 0.74/ 11.1713 | +0.25 μm | −0.7 μm | −1.25 μm | +0.3 μm | 0 | +0.6 μm | 1.8 μm |
| 1/ 15.0113 | +0.7 μm | −0.7 μm | −1.3 μm | +0.5 μm | 0 | +0.8 μm | 2.1 μm |

The maximum spatial registration error is 2.1 μm.

TABLE 6

Deviation of the Centroids of the Spot Diagrams (Point Distribution Function) from a Straight Line

| Field/ Slit Elevation (mm) | 2350 nm | SWIR 775 nm | 110 nm | 1100 nm | VNIR 650 nm | 450 nm | Spatial Registration Error |
|---|---|---|---|---|---|---|---|
| 0.74/ 11.1713 | +0.2 μm | +0.1 μm | 0 | −0.0 μm | −0.6 μm | +0.9 μm | 0.9 μm |

TABLE 6-continued

Deviation of the Centroids of the Spot Diagrams
(Point Distribution Function) from a Straight Line

| Field/Slit Elevation (mm) | SWIR 2350 nm | SWIR 775 nm | 110 nm | 1100 nm | VNIR 650 nm | 450 nm | Spatial Registration Error |
|---|---|---|---|---|---|---|---|
| 1/ 15.0113 | +0.3 μm | 0 | -0.1 μm | -1.6 μm | -1.3 μm | -0.1 μm | 1.6 μm |

Design data are provided above from optic computations. These provide an excellent imaging spectrometer while considering manufacturing tolerances. The spectrometer is especially suited for space applications because of its simple assembly with few parts and compact dimensions. It has been designed for a spectral earth exploration camera project prism of the European Space Organization (ESA) with an upstream scan mirror and a mirror telescope. The usability is in no way limited thereto.

The various examples show the wide possibilities in the context of the invention.

As noted herein, and according to another feature of the invention, the spectral apparatus can include a diffraction grating. The diffraction grating can be configured on one of the two mirrors (2, 4).

It is understood that the foregoing description is that of the preferred embodiments of the invention and that various changes and modifications may be made thereto without departing from the spirit and scope of the invention as defined in the appended claims.

What is claimed is:

1. A spectral apparatus defining an optical beam path along which a beam can travel and comprising:
   an entry slit arranged on said optical beam path;
   a first concave mirror mounted on said beam path downstream of said entry slit for deflecting said beam;
   a prismatic unit arranged on said beam path downstream of said first concave mirror and including at least one curved prism for dispersing said beam;
   a second concave mirror arranged on said beam path for receiving and deflecting the dispersed beam; and,
   an image surface receiving the deflected and dispersed beam to provide a spectral image thereof.

2. The spectral apparatus of claim 1, said prismatic unit including a convex mirror for deflecting the dispersed beam toward said second concave mirror.

3. The spectral apparatus of claim 2, said curved prism including a prism surface and said convex mirror being supported on said prism surface.

4. The spectral apparatus of claim 1, further comprising a sphere common to both said first and second concave mirrors; and, said first and second concave mirrors being formed on said sphere.

5. The spectral apparatus of claim 1, said curved prism being a spherically curved prism.

6. The spectral apparatus of claim 5, said spherically curved prism being a Féry prism.

7. The spectral apparatus of claim 1, said prism being a first curved prism and said prismatic unit including at least one additional curved prism adjoining said first curved prism without an air gap therebetween.

8. The spectral apparatus of claim 1, further comprising a two-dimensional image detector disposed in said image surface thereby realizing an imaging spectrometer.

9. The spectral apparatus of claim 2, said first concave mirror having a radius and said convex mirror being spaced from said first concave mirror by a spacing of 0.4 to 0.6 times said radius.

10. The spectral apparatus of claim 2, said first concave mirror having a radius and said convex mirror being spaced from said first concave mirror by a spacing of 0.5 times said radius.

11. The spectral apparatus of claim 2, said first concave mirror having a first radius and said convex mirror having a second radius, said second radius being 0.4 to 0.6 times said first radius.

12. The spectral apparatus of claim 2, said first concave mirror having a first radius and said convex mirror having a second radius, said second radius being 0.5 times said first radius.

13. The spectral apparatus of claim 2, said second concave mirror having a radius and said convex mirror being spaced from said second concave mirror by a spacing of 0.4 to 0.6 times said radius.

14. The spectral apparatus of claim 2, said second concave mirror having a radius and said convex mirror being spaced from said second concave mirror by a spacing of 0.5 times said radius.

15. The spectral apparatus of claim 2, said second concave mirror having a first radius and said convex mirror having a second radius, said second radius being 0.4 to 0.6 times said first radius.

16. The spectral apparatus of claim 2, said second concave mirror having a first radius and said convex mirror having a second radius, said second radius being 0.5 times said first radius.

17. The spectral apparatus of claim 9, said first concave mirror having a focal point lying in said prismatic unit.

18. The spectral apparatus of claim 11, said first concave mirror having a focal point lying in said prismatic unit.

19. The spectral apparatus of claim 2, said first concave mirror having a first center of curvature and said convex mirror having a second center of curvature; and, said centers of curvature being spaced from each other a distance less than 0.1 times the largest radius.

20. The spectral apparatus of claim 2, said first concave mirror having a first center of curvature and said convex mirror having a second center of curvature; and, said first and second centers of curvature being coincident.

21. The spectral apparatus of claim 1, said spectral apparatus being a concentric spectrometer.

22. The spectral apparatus of claim 1, further comprising a corrective lens unit disposed between said entry slit and said first concave mirror.

23. The spectral apparatus of claim 1, further comprising a corrective lens unit disposed between said second concave mirror and said image surface.

24. The spectral apparatus of claim 1, said image surface being a first image surface, further comprising a dichroic mirror disposed between said second concave mirror and said first image surface; and, a second image surface for the spectral range reflected at said dichroic mirror.

25. The spectral apparatus of claim 2, said mirrors being arranged according to Offner objective design rules.

26. The spectral apparatus of claim 1, further comprising a diffraction grating disposed on said beam path at a location between said entry slit and said image surface.

27. A spectral apparatus defining an optical beam path along which a beam can travel and comprising:
   an entry slit arranged on said optical beam path;
   a first concave mirror mounted on said beam path downstream of said entry slit for deflecting said beam;
   a prismatic unit arranged on said beam path downstream of said first concave mirror and including at least one curved prism for dispersing said beam;

a second concave mirror arranged on said beam path downstream of said prismatic unit for receiving and deflecting the dispersed beam;

an image surface receiving the deflected and dispersed beam to provide a spectral image thereof; and, said entry slit, said first concave mirror, said prismatic unit, said second concave mirror and said image surface all conjointly defining a single plane.

* * * * *

UNITED STATES PATENT AND TRADEMARK OFFICE
CERTIFICATE OF CORRECTION

PATENT NO. : 5,781,290
DATED : July 14, 1998
INVENTOR(S) : Reinhold Bittner et al.

It is certified that error appears in the above-identified patent and that said Letters Patent is hereby corrected as shown below:

In column 7, below the Table: insert -- The maximum spatial registration error is 1.6 $\mu$m. --.

Signed and Sealed this

Twenty-fifth Day of May, 1999

Attest:

Q. TODD DICKINSON

Attesting Officer

Acting Commissioner of Patents and Trademarks